United States Patent
Lee

(10) Patent No.: US 7,809,563 B2
(45) Date of Patent: Oct. 5, 2010

(54) SPEECH RECOGNITION BASED ON INITIAL SOUND EXTRACTION FOR NAVIGATION AND NAME SEARCH

(75) Inventor: Bong Woo Lee, Icheon-shi (KR)

(73) Assignee: Hyundai Autonet Co., Ltd., Icheon-Shi, Kyungki-Do (KR)

(*) Notice: Subject to any disclaimer, the term of this patent is extended or adjusted under 35 U.S.C. 154(b) by 1029 days.

(21) Appl. No.: 11/548,665

(22) Filed: Oct. 11, 2006

(65) Prior Publication Data
US 2007/0136070 A1 Jun. 14, 2007

(30) Foreign Application Priority Data
Oct. 14, 2005 (KR) .................. 10-2005-0096833

(51) Int. Cl.
G10L 15/02 (2006.01)
G10L 15/04 (2006.01)

(52) U.S. Cl. .............. 704/251; 704/254; 704/255; 379/88.03

(58) Field of Classification Search ............. 704/247, 704/248, 249, 252, 253, 254, 255, 270, 251; 701/208, 211; 379/88.03
See application file for complete search history.

(56) References Cited

U.S. PATENT DOCUMENTS

| 4,625,287 | A | * | 11/1986 | Matsuura et al. | 704/254 |
| 5,040,218 | A | * | 8/1991 | Vitale et al. | 704/260 |
| 5,940,793 | A | * | 8/1999 | Attwater et al. | 704/231 |
| 5,956,684 | A | * | 9/1999 | Ishii et al. | 704/275 |
| 6,108,631 | A | * | 8/2000 | Ruhl | 704/270 |
| 6,411,893 | B2 | * | 6/2002 | Ruhl | 701/207 |
| 6,421,672 | B1 | * | 7/2002 | McAllister et al. | 1/1 |
| 6,510,235 | B1 | * | 1/2003 | Shin et al. | 382/100 |
| 6,963,871 | B1 | * | 11/2005 | Hermansen et al. | 704/1 |
| 6,978,237 | B2 | * | 12/2005 | Tachimori et al. | 704/238 |
| 7,277,846 | B2 | * | 10/2007 | Satoh | 704/3 |
| 7,310,602 | B2 | * | 12/2007 | Takaichi et al. | 704/252 |
| 7,353,172 | B2 | * | 4/2008 | Emonts et al. | 704/254 |
| 2001/0032073 | A1 | * | 10/2001 | Boehme | 704/229 |
| 2002/0035474 | A1 | * | 3/2002 | Alpdemir | 704/270 |
| 2002/0082832 | A1 | * | 6/2002 | Nagashima | 704/250 |
| 2005/0288063 | A1 | * | 12/2005 | Seo et al. | 455/563 |
| 2007/0005567 | A1 | * | 1/2007 | Hermansen et al. | 707/3 |

FOREIGN PATENT DOCUMENTS

| JP | 11-184495 | 7/1999 |
| JP | 2001-083983 | 3/2001 |
| KR | 102006000915 | 1/2006 |

* cited by examiner

*Primary Examiner*—Martin Lerner
(74) *Attorney, Agent, or Firm*—IPLA P.A.; James E. Bame

(57) ABSTRACT

Provided are a navigation system having a name search function based on voice recognition, and a method thereof. The navigation system having a map database in which names of topography features on map data are mapped to the map data, includes a voice recognizing unit, an initial sound extracting unit, and a controller. The voice recognizing unit receives a voice uttered by a user, recognizes the uttered voice, and converts the recognized voice into text data. The initial sound extracting unit extracts only an initial sound of each syllable from the text data. The controller receives the initial sound from the initial sound extracting unit, and searches the map database for a destination using an initial sound name search.

2 Claims, 4 Drawing Sheets

SPEECH RECOGNITION BASED ON INITIAL SOUND EXTRACTION FOR NAVIGATION AND NAME SEARCH

CROSS REFERENCE

Applicant claims foreign priority under Paris Convention and 35 U.S.C. §119 to a Korean Patent Application No. 10-2005-0096833, filed Oct. 14, 2005 with the Korean Intellectual Property Office.

BACKGROUND OF THE INVENTION

1. Field of the Invention

The present invention relates to a name search of a navigation system, and more particularly, to a navigation system having a name search function based on voice recognition and a method thereof, for voice-recognizing a name uttered by a user, detecting only an initial sound of each syllable of the voice-recognized name, and searching the name.

2. Description of the Related Art

In general, a navigation system refers to a system for mapping a self position measured using a global positioning system (GPS) to map data, receiving a street and/or a destination from a user, searching a path to the destination, mapping and displaying the searched path to the map data, and performing road guidance along the path.

In the navigation system, a method for searching the map data on the street and the destination inputted by the user is a name searching method for inputting and searching a name of a typical building or subway station of the destination, for example, HYUNDAI AUTONET or Gangnam station, and an address searching method for inputting and searching an address.

The name searching method is divided into a general name searching method and an initial sound name searching method. The general name searching method inputs all names. The initial sound name searching method inputs and searches only an initial sound of the name in order to eliminate an inconvenience that the user inputs all the names one by one, using the general name searching method.

As described above, the conventional name searching methods of the navigation system cause many user inconveniences because the user manipulates and presses a key of the navigation system or a remote controller one by one a few to dozens of times, and it takes a long time for the user to input the name.

SUMMARY OF THE INVENTION

Accordingly, the present invention is directed to a navigation system having a name search function based on voice recognition and a method thereof that substantially overcome one or more of the limitations and disadvantages of the conventional art.

One object of the present invention is to provide a navigation system having a name search function based on voice recognition and a method thereof, for voice recognizing a name uttered by a user, extracting the voice-recognized name or only an initial sound of each syllable of the voice-recognized name, and searching a street and a destination.

One object of the present invention is to provide a navigation system having a name search function based on voice recognition and a method thereof, for voice recognizing a name uttered by a user, extracting the voice-recognized name or only an initial sound of each syllable of the voice-recognized name, and searching a street and a destination.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims as well as the appended drawings.

To achieve the above and other objects and advantages, and in accordance with the purpose of the invention, as embodied and broadly described herein, there is provided a navigation system having a map database in which names of topography features on map data are mapped to the map data. The system includes a voice recognizing unit, an initial sound extracting unit, and a controller. The voice recognizing unit receives a voice uttered by a user, recognizes the uttered voice, and converts the recognized voice into text data. The initial sound extracting unit extracts only an initial sound of each syllable from the text data. The controller receives the initial sound from the initial sound extracting unit, and searches the map database for a destination using an initial sound name search.

In another aspect of the present invention, there is provided a navigation system having a map database in which names of topography features on map data are mapped to the map data. The system includes a voice recognizing unit, and a controller. The voice recognizing unit receives a voice uttered by a user, recognizes the uttered voice on a per-syllable basis, recognizes an initial sound, and converts the recognized initial sound into text data. The controller receives the initial sound text data, and searches the map database for a destination using an initial sound name search.

In a further another aspect of the present invention, there is provided a method for searching a name in a navigation system having a name search function based on voice recognition. The method includes determining whether or not a voice name search mode is set; when it is determined that the voice name search mode is set, checking whether or not a voice is inputted; when it is checked that the voice is inputted, performing the voice recognition; determining whether or not an initial sound name search mode is set; when it is determined that the initial sound name search mode is set, extracting an initial sound from each syllable of the voice recognized name; and performing an initial sound name search by the extracted initial sound.

In a still another aspect of the present invention, there is provided a method for searching a name in a navigation system having a name search function based on voice recognition. The method includes determining whether or not a voice name search mode is set; when it is determined that the voice name search mode is set, checking whether or not a voice is inputted; when it is checked that the voice is inputted, determining whether or not an initial sound name search mode is set; when it is determined that the initial sound name search mode is set, outputting an initial sound recognized at the time of voice recognition on a syllable-per basis; and performing an initial sound name search by the recognized initial sound.

It is to be understood that both the foregoing summary and the following detailed description of the present invention are merely exemplary and intended for explanatory purposes only.

BRIEF DESCRIPTION OF THE DRAWINGS

The accompanying drawings, which are included to aid in understanding the invention and are incorporated into and constitute a part of this application, illustrate embodiment(s)

of the invention and together with the description serve to explain the principles of the invention. In the drawings.

DETAILED DESCRIPTION OF THE INVENTION

Figure 1:
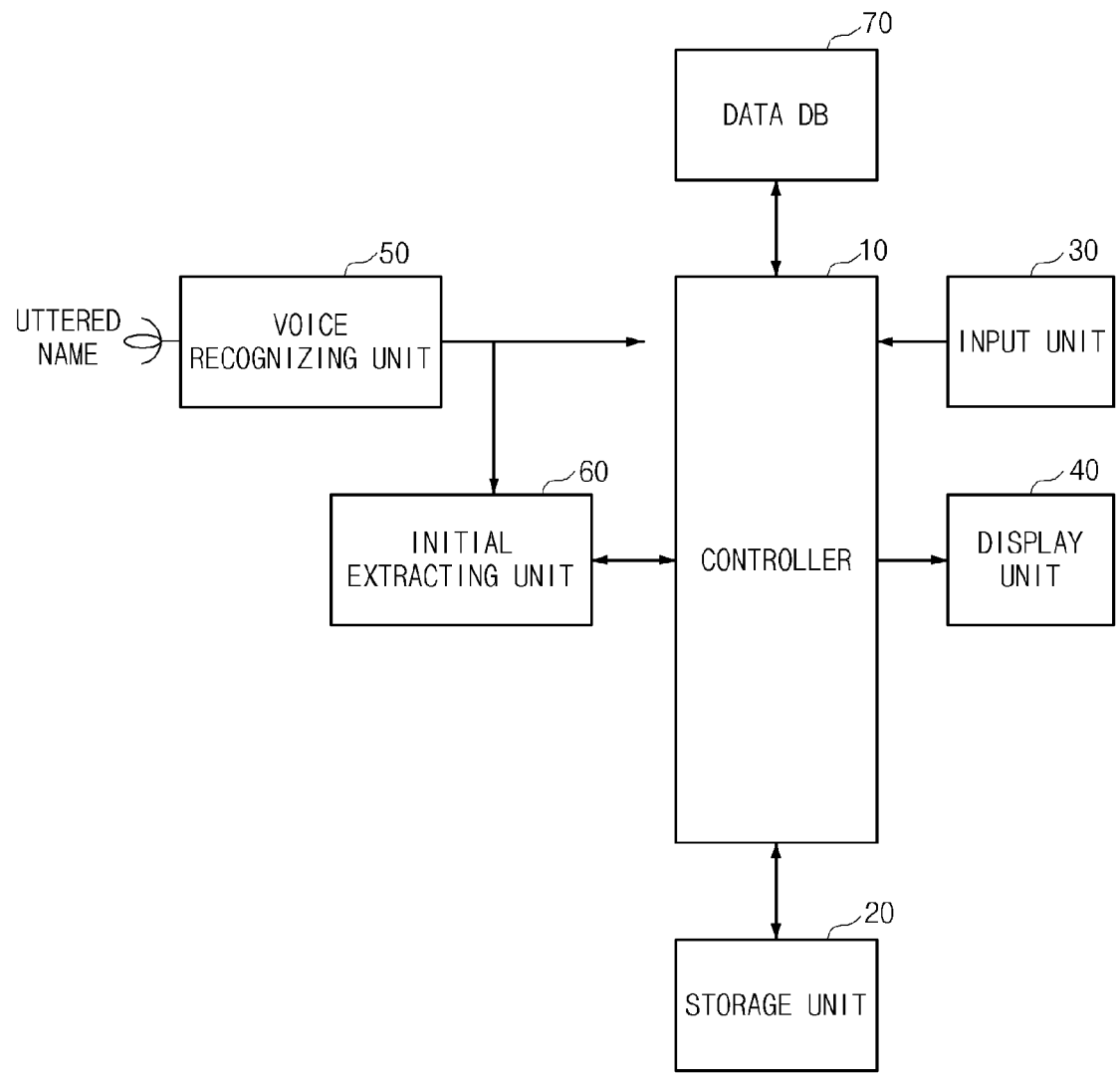
FIG. 1 illustrates a construction of a navigation system having a name search function based on voice recognition according to the present invention.

Reference will now be made in detail to the preferred embodiments of the present invention, examples of which are illustrated in the accompanying drawings. Wherever possible, the same reference numerals will be used throughout the drawings to refer to the same or like parts.

The present invention suggests a method for inputting a name by voice at the time of searching a destination using the name in a navigation system.

The present invention suggests a method (hereinafter, referred to as "first exemplary embodiment") for performing a syllable based voice recognition using a tri-phone as a basic recognition unit at the time of voice recognition, extracting only initial sounds of the respective syllables from outputted names, and searching a destination by an initial sound name searching method. The present invention suggests a method (hereinafter, referred to as "second exemplary embodiment") for recognizing an initial sound, a medial sound, and a final sound using a tri-phone, outputting the recognized initial sounds, and performing an initial sound name search by the initial sounds.

A construction and an operation of the navigation system having a name search function based on voice recognition according to the present invention will be described with reference to the accompanying drawings below.

FIG. 1 illustrates the construction of the navigation system having the name search function based on the voice recognition according to the present invention.

The inventive navigation system includes a controller 10, a storage unit 20, an input unit 30, a display unit 40, a voice recognizing unit 50, an initial sound extracting unit 60, and a map database (DB) 70.

The controller 10 controls a general operation of the navigation system according to the present invention.

The storage unit 20 includes a region for storing a control program for controlling an operation of the navigation system, and a region for temporarily storing data generated in execution of the control program.

The input unit 30 includes a key for allowing a user to control a function of the navigation system or a plurality of keys for inputting a via and a destination. The input unit 30 generates and outputs key data on the keys, to the controller 10.

The display unit 40 displays an operation mode, an operation state, and map data of the navigation system.

The map DB 70 stores the map data to which topography features are mapped along latitude and longitude, and information on each name and address of the topography features are mapped.

The voice recognizing unit 50 receives the name uttered by the user, through a microphone (MIC), and performs the syllable based voice recognition of the uttered name using the tri-phone as the basic unit. The voice recognizing unit 50 converts voice recognized data on the uttered name into text data. This is because names stored in the map DB 70 are mapped as the text data to the topography features.

The initial sound extracting unit 60 receives the text data on the voice recognized name outputted from the voice recognizing unit 50, extracts the initial sound of each syllable of the name, and outputs the extracted initial sound to the controller 10.

The controller 10 performs the initial sound name search by the initial sounds of the name outputted from the initial sound extracting unit 60.

In a second exemplary embodiment of the present invention, a navigation system does not need the initial sound extracting unit 60 among elements of the navigation system according to the first exemplary embodiment of the present invention. However, a voice recognizing unit 50 recognizes an initial sound of each syllable of a uttered name, which is recognized in execution of a syllable based voice recognition, using a tri-phone as a basic recognition unit, and converts the initial sound into text data.

Figure 3:
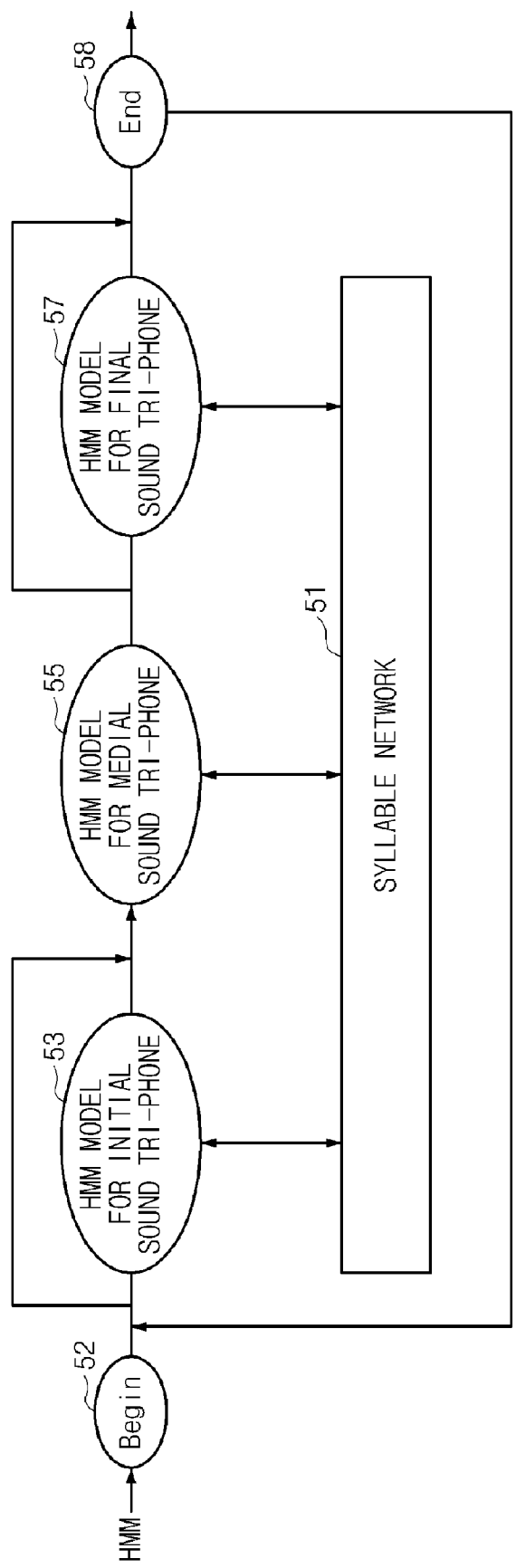
FIG. 3 illustrates a transition path between models depending on a syllable based linking word recognition of a voice recognizing unit according to the present invention.

FIG. 3 illustrates a transition path between models depending on a syllable based linking word recognition of the voice recognizing unit according to the present invention. An operation of the voice recognizing unit 50 according to the second exemplary embodiment of the present invention will be described with reference to FIG. 3.

In order to perform the syllable based voice recognition using the tri-phone as the basic unit, the voice recognizing unit 50 performs the syllable based voice recognition through five state transitions as shown in FIG. 3. In FIG. 3, a first state 52 and a fifth state 58 represent the beginning and the end of the syllable. In a second state 53, the voice recognizing unit 50 generates a Hidden Markov Model (HMM) for the initial sound, and recognizes the initial sound. The voice recognizing unit 50 transits to a third state 55. In the third state 55, the voice recognizing unit 50 generates a hidden Markov model for the medial sound, forms a syllable network considering the recognized initial sound and a phoneme variation, and recognizes the final sound. In a fourth state 57, the voice recognizing unit 50 generates a hidden Markov model for the final sound, forms a syllable network considering the medial sound and a phoneme variation, and recognizes the final sound. In the fifth state 58, the voice recognizing unit 50 performs the syllable based recognition by the recognized initial sound, medial sound, and final sound. Thus, in the second exemplary embodiment of the present invention, the voice recognizing unit 50 converts the initial sounds, which are recognized in the second state 53 from each syllable of the name uttered by the user, into the text data, and outputs the converted text data to the controller 10.

Figure 2:
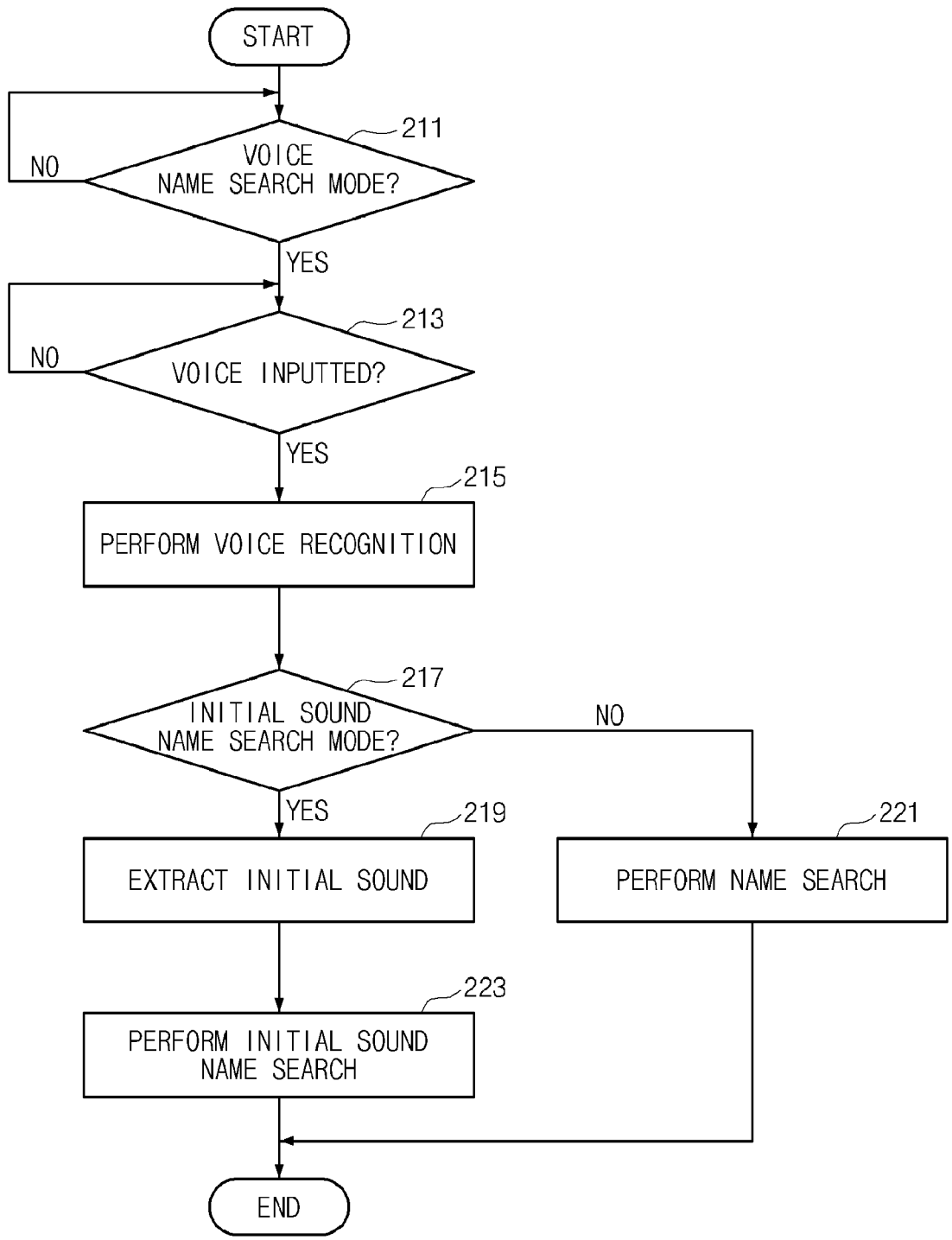
FIG. 2 is a flowchart illustrating a method for recognizing a voice in a navigation system having a name search function based on voice recognition according to a first exemplary embodiment of the present invention.

FIG. 2 is a flowchart illustrating a method for recognizing a voice in the navigation system having the name search function based on the voice recognition according to the first exemplary embodiment of the present invention.

Referring to FIGS. 1 and 2, in Step 211, the controller 10 checks whether or not it receives key data for setting a voice name search mode, from the input unit 30.

Upon the setting of the voice name search mode of the Step 211, in Step 213, the controller 10 determines whether or not it receives the voice through the voice recognizing unit 50.

Upon the inputting of the voice of the Step 213, in Step 215, the controller 10 controls the voice recognizing unit 50 to perform the voice recognition and output the voice recognized name. In Step 217, the controller 10 checks whether or not it sets the initial sound name search mode. The voice recognized name is outputted to the initial sound extracting unit 60 and/or the controller 10, and is buffered.

Upon the setting of the initial sound name search mode of the Step 217, in Step 219, the controller 10 controls the initial sound extracting unit 60 to extract the initial sound from each syllable of the voice recognized name.

After that, in Step 223, the controller 10 performs the initial sound name search by the extracted initial sounds.

In the absence of the setting of the initial sound name search mode of the Step 217, in Step 221, the controller 10 performs a general name search.

Figure 4:
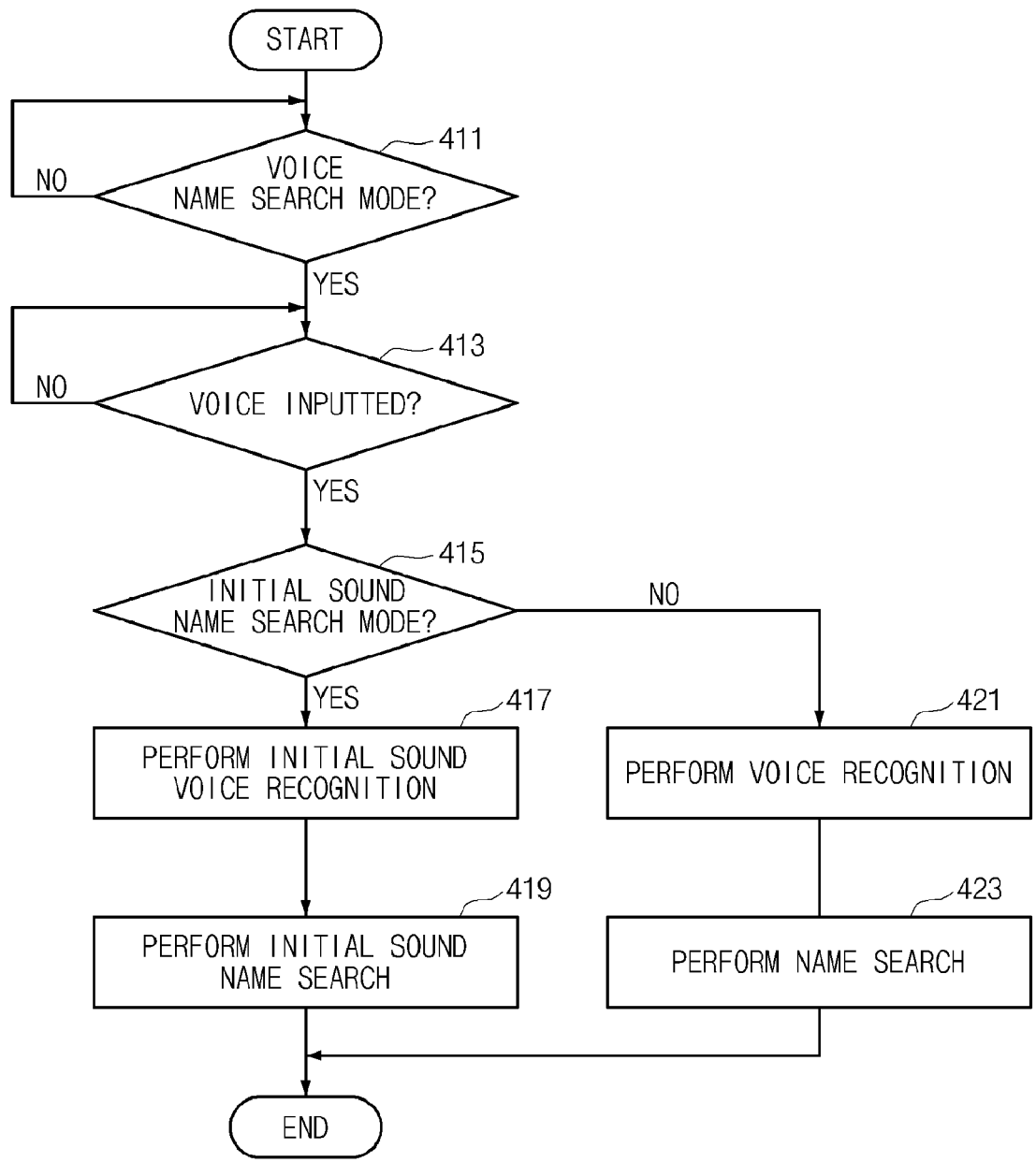
FIG. 4 is a flowchart illustrating a method for recognizing a voice in a navigation system having a name search function based on voice recognition according to a second exemplary embodiment of the present invention.

FIG. 4 is a flowchart illustrating a method for recognizing the voice in the navigation system having the name search function based on the voice recognition according to a second exemplary embodiment of the present invention. A description will be made with reference to FIGS. 1 and 4 below.

In Step 411, the controller 10 checks whether or not it receives key data for setting a voice name search mode, from the input unit 30.

Upon the setting of the voice name search mode of the Step 411, in Step 413, the controller 10 determines whether or not it receives a voice from the voice recognizing unit 50.

Upon the inputting of the voice of the Step 413, in Step 415, the controller 10 determines whether or not it sets an initial sound name search mode.

If not in the initial sound name search mode, the controller 10 performs a syllable based voice recognition in Step 421, and performs a name search for the recognized name of the Step 421 in Step 423.

In the initial sound name search mode, the controller 10 performs the initial sound recognition for each syllable of the names uttered by the user in Step 417, and performs an initial sound name search for the recognized initial sounds in Step 419.

As described above, the present invention has an advantage that a driver does not need to input the names one by one and thus, has a convenience since the name search uses a voice recognition technology.

The present invention has an advantage that the search can be performed more quickly since it provides the initial sound name search function based on the voice recognition.

While the present invention has been described with reference to exemplary embodiments thereof, it will be apparent to those skilled in the art that various modifications can be made therein without departing from the spirit and scope of the invention as defined by the appended claims and their equivalents.

What is claimed is:

1. A method for searching a name in a navigation system having a name search function based on voice recognition, the method comprising steps of:
    determining whether or not a voice name search mode is set;
    when it is determined that the voice name search mode is set, checking whether or not a voice is inputted;
    when it is checked that the voice is inputted, performing the voice recognition;
    determining whether or not an initial sound name search mode is set;
    when it is determined that the initial sound name search mode is set, extracting an initial sound from each syllable of the voice recognized name; and
    performing an initial sound name search by the extracted initial sound.

2. A method for searching a name in a navigation system having a name search function based on voice recognition, the method comprising steps of:
    determining whether or not a voice name search mode is set;
    when it is determined that the voice name search mode is set, checking whether or not a voice is inputted;
    when it is checked that the voice is inputted, determining whether or not an initial sound name search mode is set;
    when it is determined that the initial sound name search mode is set, outputting an initial sound recognized at a time of voice recognition on a syllable-per basis; and
    performing an initial sound name search by the recognized initial sound.

* * * * *